(12) United States Patent
Casale et al.

(10) Patent No.: US 9,880,718 B1
(45) Date of Patent: Jan. 30, 2018

(54) SYSTEMS AND METHODS FOR CUSTOMIZING SUB-APPLICATIONS AND DASHBOARDS IN A DIGITAL HUDDLE ENVIRONMENT

(71) Applicant: MASSACHUSETTS MUTUAL LIFE INSURANCE COMPANY, Springfield, MA (US)

(72) Inventors: Robert Casale, Bristol, CT (US); Abigail O'Malley, Brighton, MA (US); Kedzie Teller, Brookline, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 191 days.

(21) Appl. No.: 14/733,447

(22) Filed: Jun. 8, 2015

Related U.S. Application Data

(60) Provisional application No. 62/008,937, filed on Jun. 6, 2014, provisional application No. 62/008,888, filed on Jun. 6, 2014, provisional application No. 62/008,896, filed on Jun. 6, 2014, provisional application No. 62/008,916, filed on Jun. 6, 2014, provisional application No. 62/008,948, filed on Jun. 6, 2014.

(51) Int. Cl.
*G06F 3/00* (2006.01)
*G06F 3/0484* (2013.01)
*G06F 3/0481* (2013.01)

(52) U.S. Cl.
CPC ...... *G06F 3/04842* (2013.01); *G06F 3/04817* (2013.01)

(58) Field of Classification Search
CPC .......... G06F 3/04842; G06F 17/30873; G06Q 50/01
See application file for complete search history.

(56) References Cited

U.S. PATENT DOCUMENTS

| | | | |
|---|---|---|---|
| 7,062,511 B1 * | 6/2006 | Poulsen | G06F 17/30873 |
| 7,802,207 B2 * | 9/2010 | Agboatwalla | G06F 17/30873 715/733 |
| 7,827,494 B1 * | 11/2010 | Hedayatpour | G06F 8/38 709/203 |
| 8,072,439 B2 | 12/2011 | Hillis et al. | |
| 8,181,115 B2 | 5/2012 | Irving | |
| 9,594,823 B2 | 3/2017 | Chaney et al. | |
| 2003/0046401 A1 | 3/2003 | Abbott et al. | |
| 2007/0240063 A1 * | 10/2007 | Cheng | G06F 17/30873 715/741 |
| 2008/0263024 A1 | 10/2008 | Landschaft et al. | |
| 2009/0119280 A1 * | 5/2009 | Waters | H04W 4/003 |
| 2009/0204906 A1 | 8/2009 | Irving | |

(Continued)

*Primary Examiner* — Omar Abdul-Ali
(74) *Attorney, Agent, or Firm* — Eric L. Sophir; Dentons US LLP

(57) ABSTRACT

The present systems and methods for customizing sub-applications and dashboards in a digital huddle environment are disclosed. The disclosed system and method may be employed for customizing sub-applications according to predefined options, including text, images and numbers; as well as customizing dashboards according to user requirements for showing goals progress, next meetings notifications, schedule, meetings alerts, and the like, according to the requirements of a particular team working in a digital huddle.

10 Claims, 10 Drawing Sheets

(56) References Cited

U.S. PATENT DOCUMENTS

| | | | |
|---|---|---|---|
| 2010/0070881 A1* | 3/2010 | Hanson | G06Q 10/06 715/753 |
| 2010/0192072 A1 | 7/2010 | Spataro et al. | |
| 2011/0022991 A1 | 1/2011 | Hillis et al. | |
| 2011/0113348 A1* | 5/2011 | Twiss | G06Q 10/10 715/753 |
| 2012/0110087 A1 | 5/2012 | Culver et al. | |
| 2012/0124484 A1* | 5/2012 | Robinson | G06Q 10/00 715/753 |
| 2012/0159359 A1* | 6/2012 | Ehrler | G06F 3/0481 715/763 |
| 2012/0278738 A1* | 11/2012 | Kruse | G06Q 10/10 715/754 |
| 2013/0091440 A1* | 4/2013 | Kotler | G06Q 10/10 715/753 |
| 2013/0218978 A1 | 8/2013 | Weinstein et al. | |
| 2013/0254658 A1* | 9/2013 | Nestler | G06Q 10/103 715/273 |
| 2014/0082525 A1* | 3/2014 | Kass | H04L 65/403 715/753 |
| 2014/0172485 A1* | 6/2014 | Thean | G06Q 10/06 705/7.17 |
| 2014/0189818 A1* | 7/2014 | Meyer | G06F 21/62 726/4 |
| 2014/0282106 A1 | 9/2014 | Smith et al. | |
| 2014/0282135 A1* | 9/2014 | Segre | G06F 9/4443 715/764 |
| 2014/0337778 A1* | 11/2014 | Armitage | G06F 3/0484 715/771 |
| 2015/0067058 A1 | 3/2015 | Vellozo Luz et al. | |
| 2015/0120577 A1 | 4/2015 | Lobo et al. | |
| 2015/0149929 A1* | 5/2015 | Shepherd | H04L 65/403 715/753 |
| 2015/0229533 A1* | 8/2015 | Vida | H04L 67/306 715/736 |
| 2016/0100019 A1 | 4/2016 | Leondires | |

\* cited by examiner

SYSTEMS AND METHODS FOR CUSTOMIZING SUB-APPLICATIONS AND DASHBOARDS IN A DIGITAL HUDDLE ENVIRONMENT

CROSS-REFERENCE TO RELATED APPLICATIONS

This application claims priority to U.S. Provisional Patent Application Ser. No. 62/008,937, filed Jun. 6, 2014, U.S. Provisional Patent Application Ser. No. 62/008,888, filed Jun. 6, 2014, U.S. Provisional Patent Application Ser. No. 62/008,896, filed Jun. 6, 2014, U.S. Provisional Patent Application Ser. No. 62/008,916, filed Jun. 6, 2014, and U.S. Provisional Patent Application Ser. No. 62/008,948, filed Jun. 6, 2014, all of which are hereby incorporated by reference in their entirety.

TECHNICAL FIELD

The present disclosure relates in general to collaboration systems and, more specifically, to customizing sub-applications and dashboards in a digital huddle environment.

BACKGROUND

Conventionally, team members working on one or more projects within a company may get together in a huddle or micro-meeting on a regular basis to share information, discuss topics, evaluate performance, identify issues and/or solve problems collaboratively. Since the introduction of the huddle, whiteboards have acted as the traditional tool for storing all information collected during the active huddle session. However, it may not be possible for all participants in a meeting to be in the same physical location at the same time, which may create a need for modifying the current huddle methodology.

Alternatives to overcome the challenge of gathering team members at different locations for a huddle may include the use of one or more collaboration tools such as conference phone calls, video conferences, Internet relay chat (IRC), and instant messaging, among others. Nevertheless, the whiteboard is still the most commonly used tool in huddle boards, because the aforementioned collaboration tools are generic ways to connect people and may not offer a consistent way to be fully engaged in huddles. As a result, all team members must be physically located in the same room in order to be fully engaged in the huddle session.

Other alternatives to overcome the above drawbacks are systems configurations that enable remote huddle collaboration between team members of a given project content, which may take many forms including contact information, calendar items, mail, audio, photos, documents, and tasks or actions. A huddle user interface may include a predefined region for applications that can function as a home screen for a user, providing relevant content and quick access to collaboration tools. Applications' regions provide users with a predefined view or dashboard to monitor the current state of a subset of content obtainable through a computing device. Individual applications provide users with access to applications, application content, remote content and/or independent functionality. Typically, applications regions are represented in a small or thumbnail view that provides some minimal amount of information. One or more applications regions can provide a user with the data and tasks most likely to be relevant to the particular user. Nevertheless, it is likely that a library of applications may not meet the requirements of every huddle board.

Conventional approaches to meetings amongst remote users fail address all of the deficiencies of the conventional collaboration tools. A web meeting may allow a user to share a computer desktop with another user in a remote location. But the user must select which application should be presented on the computer desktop, so there is no ability to present a page that has information from multiple sub-applications that are dynamically updated. Further, the user cannot include annotations overlaid on the page that are simultaneously presented to the remote user and also stored with that particular page such that the particular page can be retrieved at a later date along with those annotations.

Moreover, conventional extranets are capable of sharing information from a common source, but these extranets do not offer real-time collaboration through real-time updates and simultaneous displays to other users. Further, these conventional extranets do not utilize sub-applications that dynamically display data associated with users simultaneously accessing the extranet. Conventional computer solutions do not offer the desired collaboration, real-time updating, dynamic presentation of data, and linking of additional content to the displayed data.

Therefore, there is still a need for a huddle user interface that allows users to create their own applications and optimize the presentation of content within a digital huddle environment.

SUMMARY

Systems and methods for customizing sub-applications and dashboards in a digital huddle environment are disclosed. The disclosed system may be employed for customizing sub-applications according to predefined options including text, images and numbers; as well as customizing dashboards according to user requirements for showing goals progress, next meetings notifications, schedule, meetings alerts, and the like. Method for customizing sub-applications and dashboards in a digital huddle environment may allow customization of the sub-application regions according to the requirements of a particular team working in a digital huddle.

In some embodiments, a computer-implemented method comprises identifying, by a computer, a one or more huddle board records associated with a user; providing, by a computer, a graphical user interface webpage displaying at a user device the list of one or more huddle board records associated the user; upon receiving from the user device a selection of a huddle board record through the graphical user interface, providing, by the computer, a huddle board page to the user device, the huddle board page comprising a graphical user interface configured to display one or more sub-applications containing content that is associated with a particular sub-application; receiving, by the computer, from the user device, a selection of a new sub-application for inclusion to the huddle board page, the new sub-application stored in a sub-application database comprising non-transitory machine-readable storage media configured to store one or more sub-applications; upon the computer determining the user has access rights to add the new sub-application to the huddle board page, based upon access rights in the huddle board record: fetching, by the computer, the new sub-application from the sub-application database, wherein the new sub-application contains content configured to be displayed according to a set of content rules associated with the new sub-application; generating, by the computer, in the huddle board record a set of access rights for one or more users associated with the new sub-application, based upon one or more rights selections received from the user device; updating, by the computer, the graphical user interface of the huddle board page based on the new sub-application and the set of content rules associated with the new sub-application; receiving, by the computer, one or more inputs from a second computing device through the graphical user interface configured to display the huddle board page; and updating, by the computer, the huddle board page according to the one or more inputs, wherein the graphical user interface is configured to display real-time updates to the one or more sub-applications and the new sub-application, based on inputs received from one or more user computing devices.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

FIG. 10 illustrates an application of the disclosed method for customizing sub-applications and dashboards in a digital huddle environment, according to an exemplary embodiment.

DETAILED DESCRIPTION

Figure 1:
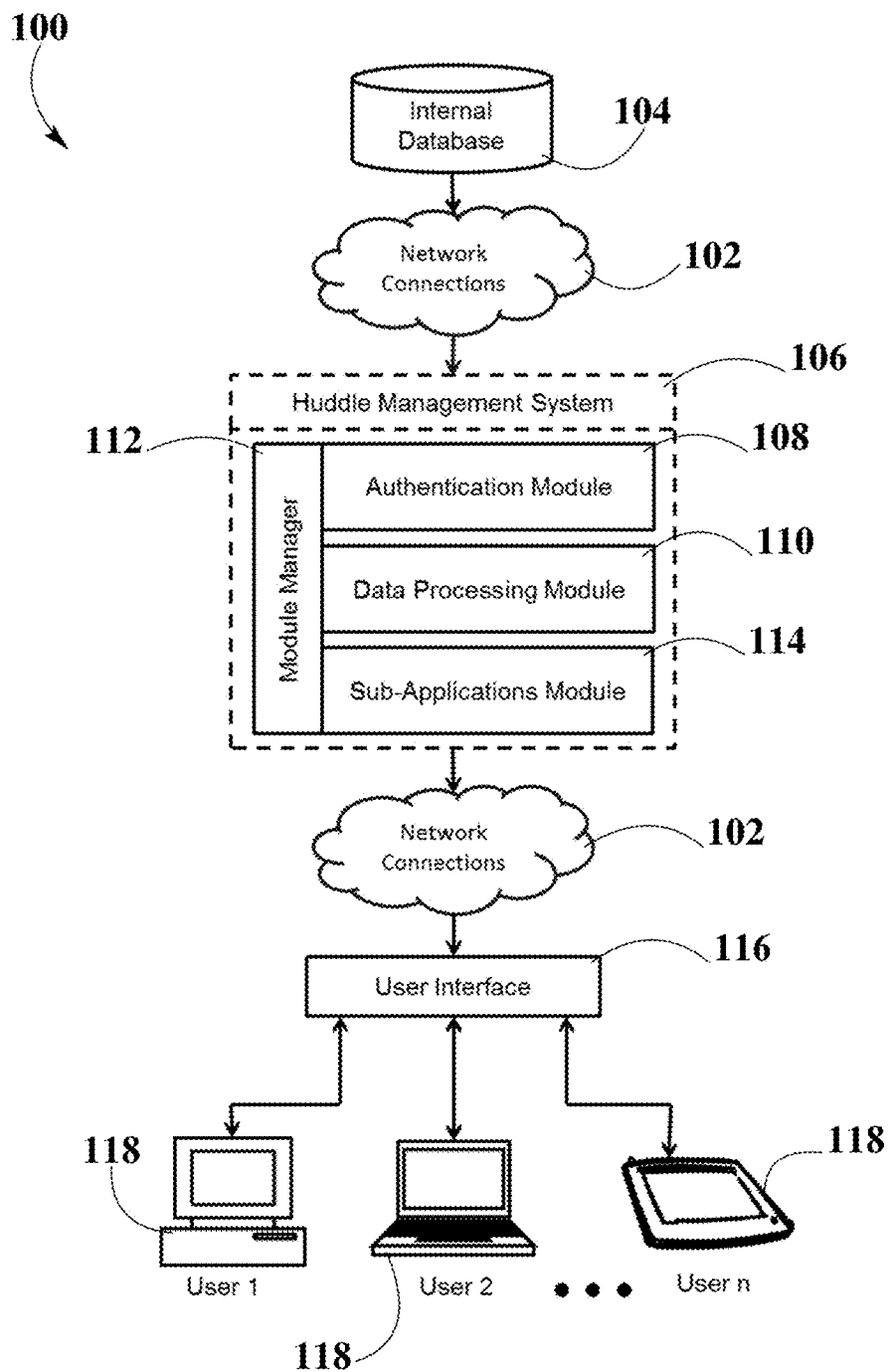
FIG. 1 is a block diagram of an exemplary system architecture for a digital huddle collaboration system, according to an embodiment.

The present disclosure is here described in detail with reference to embodiments, which form a part here. Other embodiments may be used and/or other changes may be made without departing from the spirit or scope of the present disclosure. The illustrative embodiments described in the detailed description are not meant to be limiting of the subject matter presented.

As used herein, the following terms have the following definitions:

"Huddle" refers to a group of two or more members of a project and organizational team, brought together on a regular basis to recognize outstanding contributions, evaluate performance, identify issues, and solve problems collaboratively.

"Huddle board" refers to a user interface generated by a huddle collaboration system which may display the content collected during a huddle in the form of one or more sub-applications.

"Active Huddle" refers to a huddle board which a leader may have started and to which one or more participants may join remotely through a huddle collaboration system.

"Huddle summary" refers to a user interface generated by a huddle collaboration system which may show one or more sub-applications in the huddle board, and each sub-application may display a summary-level view of the data it may contain.

"Leader" refers to a team member that may initiate and manage a huddle session. A leader may have an additional set of permissions that may include for example, the ability to create huddle boards, configure or otherwise modify a huddle session, among others.

"Sub-application" refers to a software tool that may enable remote collaboration between authenticated team members in a digital huddle environment.

"User's Huddle Boards" refers to a user interface generated by a huddle collaboration system which may display a list of the user's huddle boards in which he/she may be participating in, and a list of public boards which may be viewed by anyone in the company.

Some embodiments provide a system that may allow for customizing sub-applications and dashboards in a digital huddle environment. The system may employ data management systems and methods in order to allow a user to customize application regions and dashboards of a digital huddle user interface.

Additionally, the present disclosure relates to a method for customizing sub-applications and dashboards in a digital huddle environment. The method for customizing sub-applications and dashboards in a digital huddle environment may include a system that may be used to process users customization options applying a huddle management system capable perform and keep record of the user preferences. The disclosed method may use internal information sources.

In some embodiments, an aspect of the present disclosure is a computer-implemented system for customizing sub-applications and dashboards in a digital huddle environment that may use information sources, such as one or more internal databases, and a huddle management system including one or more software modules, such as one or more module managers, one or more authentication modules, one or more data processing modules, and one or more sub-applications modules. The system may also include a user interface on which a customer may interact with the system by means of a computing device, such as smartphones, desktop computers, laptop computers, tablets, and PDAs, among others.

Another aspect of the present disclosure is a computer-implemented method for customizing sub-applications and dashboards in a digital huddle environment.

In another embodiment, the disclosed method may be employed when a user employs a computing device to access an options menu to customize sub-applications and dashboards after accessing the huddle board summary. A central processing unit may execute the disclosed method, which may include a user selecting, by means of a computing device, an options menu of huddle board summary user interface; the user selecting, by means of a computing device, to add a sub-application from the options menu; a huddle management system verifying the user's credentials; huddle management system checking if the user is the huddle's leader; a huddle management system allowing the huddle's leader to select a sub-application to add, if huddle management system identifies the entered credentials as ones belonging to a huddle's leader; the huddle management system checking if the leader has granted the user permission to edit the huddle board, if huddle management system does not identifies the entered credentials as ones belonging to a huddle's leader; the huddle management system allowing the user to enter again the credentials to verify the user's credentials again, if huddle management system does not recognizes that the leader has granted the user permission to edit; the huddle management system allowing the user to select a sub-application to add, if huddle management system recognizes that the leader has granted the user permission to edit; the user selecting, by means of a computing device, a standard sub-application; a sub-applications module displaying a small view of the selected sub-application; the user selecting, by means of a computing device, a standard sub-application; the sub-applications module displaying a large view of the selected sub-application; the user editing, by means of a computing device, the title, content, size, format, among others, of the selected sub-application; a module manager recording the user's preferences in an internal database; and the huddle management system displaying an updated huddle board summary.

In other embodiments, the disclosed method may be employed when a user employs a computing device to access an options menu to customize sub-applications and dashboards after starting a huddle session. A central processing unit may execute the disclosed method, which may include a user selecting, by means of a computing device, an options menu of a huddle board summary; the user electing, by means of a computing device, to start a huddle; a huddle management system verifying the user's credentials, checking if the user is the huddle's leader; the huddle management system displaying an updated huddle board summary, if huddle management system identifies the entered credentials as ones belonging to a huddle's leader; the huddle management system checking if the leader has granted the user permission to activate a huddle session, if huddle management system does not identifies the entered credentials as ones belonging to a huddle's leader; the huddle management system allowing the user to enter again the credentials to verify the user's credentials again, if huddle management system does not recognizes that the leader has granted the user permission to activate a huddle session; the huddle management system displaying an updated huddle board summary, if huddle management system recognizes that the leader has granted the user permission to activate a huddle session; the user selecting, by means of a computing device, a sub-application to edit from the huddle board summary; the huddle management system verifying the user's credentials; the huddle management system checking if the user is the huddle's leader; the huddle management system checking if the huddle's leader has granted the user permission to edit the huddle board during an activated huddle session, if huddle management system does not identifies the entered credentials as ones belonging to a huddle's leader; the huddle management system allowing the user to enter again the credentials to verify the user's credentials again, if huddle management system does not recognize that the leader has granted the user permission to edit; a sub-applications module highlighting the customizable sub-applications, if huddle management system identifies the entered credentials as ones belonging to a huddle's leader; the user editing, by means of a computing device, the title, content, size, and format, among others, of the selected sub-application; a module manager recording the user's preferences in an internal database; and the huddle management system displaying an updated huddle board summary.

In further embodiments, the disclosed method may be employed when a user employs a computing device to access an options menu to customize sub-applications and dashboards after joining a huddle session. A central processing unit may execute the disclosed method, which may include a user selecting, by means of a computing device, the options menu of a huddle board summary; the user electing, by means of a computing device, to join a huddle from the options menu; a huddle management system verifying the user's credentials; the huddle management system checking if the user has permission to join the active huddle session; the huddle management system displaying an updated huddle board summary, if huddle management system identifies the entered credentials as ones belonging to a user with permission to join the active huddle session; the huddle management system allowing the user to enter again the credentials again, if huddle management system does not identifies the entered credentials as ones belonging to a user with permission to join the active huddle session; a user selecting, by means of a computing device, a sub-application to edit from the huddle board summary; the huddle management system verifying the user's credentials; the huddle management system checking if the huddle's leader has granted the user permission to edit the huddle board during an activated huddle session; huddle management system allowing the user to enter again the credentials to verify the user's credentials again, if huddle management system does not recognize that the leader has granted the user permission to edit; a sub-applications module highlighting the customizable sub-applications, if huddle management system recognizes that the leader has granted the user permission to edit the huddle board during an activated huddle session; the user editing, by means of a computing device, the title, content, size, and format, among others, of the selected sub-application; a module manager recording the user's preferences in an internal database; and the huddle management system displaying an updated huddle board summary.

Exemplary System Architecture for Customizing Sub-Applications and Dashboards in a Digital Huddle Environment FIG. 1 is a block diagram of an exemplary system architecture 100 for a digital huddle collaboration system, according to an embodiment. The disclosed system architecture 100 may include different components which may dynamically interact with each other through network connections 102. Network connections 102 may refer to any suitable connection between computers, such as for example intranets, local area networks (LAN), virtual private networks (VPN), wireless area networks (WAN), and the internet, among others.

System architecture 100 may include one or more computing hardware suitable for executing the components within system architecture 100, according to embodiments described here. In addition, each component may be executed by a server, a single computer, or multiple computers in a distributed configuration.

System architecture 100 may include one or more internal databases 104 and a huddle management system 106, among other components. Internal database 104 may store data generated by one or more software modules operating within huddle management system 106, data and files uploaded by a user such as a team leader or a team participant, and the credential of each authorized user of the company to allow them to access and modify huddle boards, among others.

Internal database 104 may grant access to huddle management system 106 when needed, and may be implemented through known in the art database management systems (DBMS), such as, for example, MySQL, PostgreSQL, SQLite, Microsoft SQL Server, Microsoft Access, Oracle, SAP, dBASE, FoxPro, IBM DB2, LibreOffice Base, FileMaker Pro, and/or any other type of database that may organize collections of data.

According to an embodiment, huddle management system 106 may be operatively coupled to one or more internal databases 104 through network connections 102, and may include one or more authentication modules 108, one or more data processing modules 110, one or more module managers 112, one or more sub-applications modules 114, and any other suitable software module required for the proper operation of huddle management system 106. Each software module within huddle management system 106 may include a processing unit for running related algorithms or computer executable program instructions that may be executed by a server, a single computer, or multiple computers in a distributed configuration; and may be configured to interact with one or more software modules of the same or different type operating within huddle management system 106. Each processing unit may include a processor with computer-readable medium, such as a random access memory (RAM) coupled to the processor. Examples of a processor may include a microprocessor, an application specific integrated circuit (ASIC), and a field programmable object array (FPOA), among others.

Huddle management system 106 may generate a suitable user interface 116 on a client computing device 118 through which a user, such as a team leader and/or a team participant, may interact with one or more software modules operating within huddle management system 106. The computing device 118 may be any computer type device such as smartphones, desktop computers, laptop computers, tablets, PDAs, and/or another type of processor-controlled device that may receive, process, and/or transmit digital data. In addition, user interface 116 may be configured to collect information from one or more internal databases 104, and receive and/or feed information to one or more users interacting with computing device 118.

Huddle management system 106 may be operated by one or more algorithms and/or one or more set of computer executable program instructions for integrating operation with module manager 112 in a software module that may allow multiple inputs and outputs from internal database 104, and/or any other suitable sources.

According to some embodiments of the present disclosure, huddle management system 106 may generate user interface 116 which may request and/or collect information from one or more client computing devices 118 interacting with user interface 116 via an input device, such as a touch screen, a mouse, a keyboard, a keypad, and others. Authentication module 108 may receive the user's credentials through client computing device 118 and may validate them in order to assign authorization to access, activate, edit, and/or manage one or more huddle boards and/or sub-applications in the huddle board. Data processing module 110 may receive and process information collected during an active huddle session, and may store this information in internal database 104 when needed. Data processing module 110 may also be configured to automatically retrieve information requested by one or more client computing devices 118 and/or one or more software modules, where this information may be obtained from internal database 104 and/or the suitable operation of one or more software modules operating within huddle management system 106. Module manager 112 may interact with one or more software modules operating within huddle management system 106, may control the operation of huddle collaboration system, and may process requests from one or more client computing devices 118 and/or one or more software modules, among other activities. Huddle management system 106 may generate user interface 116 which may display the content of a huddle to one or more users in the form of one or more sub-applications (not shown in FIG. 1). Internal database 104 may store any suitable data generated from the operation of one or more software modules within huddle management system 106 and may make it available for further analysis performed by one or more software modules within huddle management system 106, and/or one or more users.

Sub-applications module 114 may be employed in the display of a suitable user interface 116 on a client computing device 118, so that a user, such as a team leader and/or a team participant, may interact with huddle management system 106 allowing for the user to perform customization of the sub-applications regions according to the requirements of the user's team working in a digital huddle. Client computing device 118 may be any computer type device such as smartphones, desktop computers, laptop computers, tablets, PDAs, and/or another type of processor-controlled device that may receive, process, and/or transmit digital data. Data derived from the user customization of sub-applications regions or dashboards may be stored in internal database 104 in order to keep record of the user preferences.

The system architecture 100 may allow for one or more client computing device 118, displaying a graphical user interface 116 configured to receive information from the system architecture 100, to request and/or feed information dynamically through the interaction of the client computing device 118 with different software modules. Examples of client computing devices 118 may include smartphones, desktop computers, laptop computers, tablets, and PDAs, among others.

In some embodiments, one or more software modules included in the system architecture 100 of the present disclosure may include one or more search engines, written in a suitable programming language for executing queries and retrieving required information, designed to use one or more sets of information related to one or more huddle sessions. The search engine may be written in a suitable programming language for executing queries and retrieving required information. The search engine may also mine data through internal database 104. The search engine may be executed in any suitable computing device, server, or any other suitable computing hardware and/or may be operated by one or more algorithms and/or one or more set of instructions for integrating operations with system architecture 100.

Figure 2:
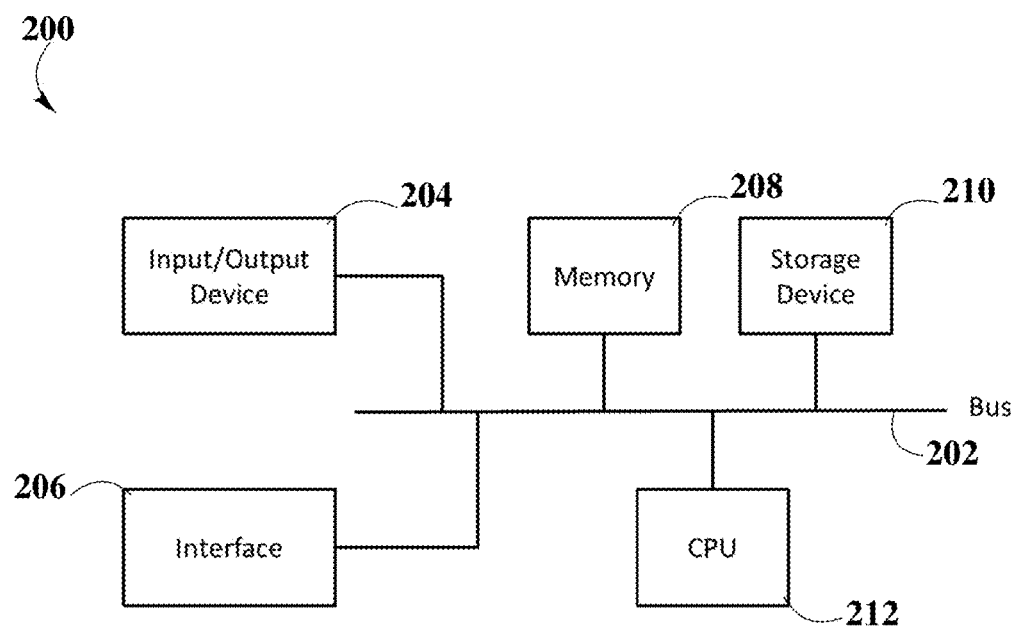
FIG. 2 is a block diagram of exemplary components in a computing device in which one or more embodiments of the present disclosure may operate.

FIG. 2 is a block diagram of exemplary components in a computing device 200 in which one or more embodiments of the present disclosure may operate.

According to some embodiments, computing device 200 may correspond to a server, a client computing device, a smartphone, a desktop computer, a laptop computer, a tablet, a PDA, and/or another type of processor-controlled device that may receive, process, and/or transmit digital data, among others. Computing device 200 may include a bus 202, an input/output device 204, a communication interface 206, a memory 208, a storage device 210, and a CPU 212 (central processing unit). In other embodiments, computing device 200 may include additional, fewer, different, or differently arranged components than are illustrated in FIG. 2.

Bus 202 may include a path that permits components within computing device 200 to communicate with each other. Input/output device 204 may include peripherals and/or other mechanisms that may enable a user to input information to computing device 200, including for example a keyboard, a mouse, a button, a touch screen, voice recognition, and biometric mechanisms, among others. Input/output device 204 may also include a mechanism that may output information to the user of computing device 200 such as, for example, a display, a light emitting diode (LED), and a speaker, among others. Communication interface 206 may include mechanisms that may enable computing device 200 to communicate with other computing devices and/or systems through network connections. Network connections may refer to any suitable connections between computers such as, for example, intranets, local area networks (LAN), virtual private networks (VPN), wireless area networks (WAN) and the internet among others. Memory 208 may include a random access memory (RAM) or another type of dynamic storage device 210 that may store information and instructions for execution by CPU 212. Storage device 210 may include a magnetic and/or optical recording medium such as read-only memory, flash memory, ferroelectric RAM (F-RAM) hard disks, floppy disks, and optical discs, among others. CPU 212 may include a microprocessor, an application specific integrated circuit (ASIC), and a field programmable gate array (FPGA), among others, that may interpret and execute instructions.

According to some embodiments of the present disclosure, at least one computing device 200, such as a server and a client computing device, among others, may perform certain operations to conduct huddles remotely and that may be required for the proper operation of a huddle collaboration system. Client computing devices and a server, among others, may perform these operations in response to CPU 212 executing software instructions contained in a computer-readable medium, such as memory 208.

The software instructions may be read into memory 208 from another computer-readable medium, such as storage device 210, or from another computing device via communication interface 206. The software instructions contained in memory 208 may cause CPU 212 to perform one or more suitable processes which may be further described later. Alternatively, hardwired circuitry may be used in place of or in combination with software instructions to implement processes described here. Thus, implementations described here are not limited to any specific combination of hardware circuitry and software.

Figure 3:
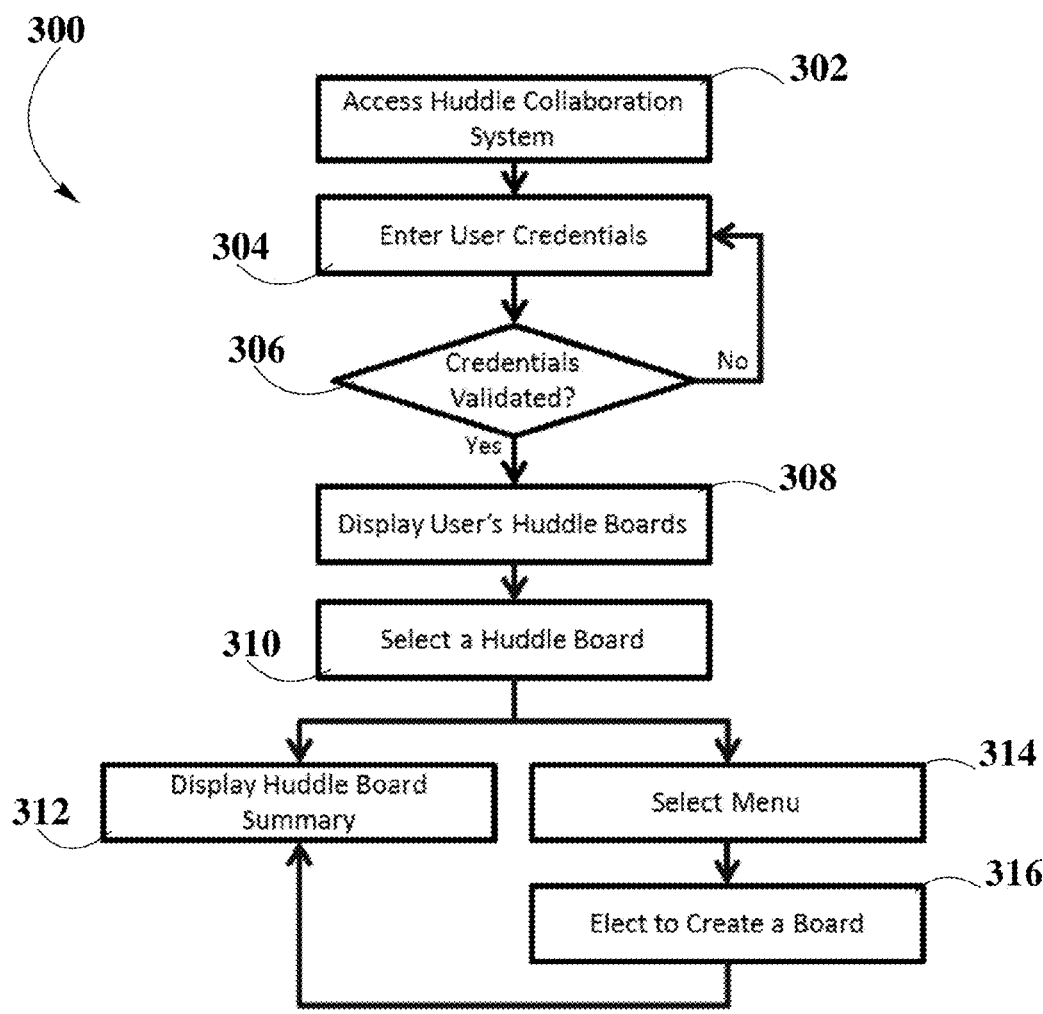
FIG. 3 is a flowchart of a process for displaying a huddle board summary, according to an exemplary embodiment.

Exemplary Method for Customizing Sub-Applications and Dashboards in a Digital Huddle Environment FIG. 3 is a flowchart of a process 300 for displaying a huddle board summary on the user interface of a computing device, according to an exemplary embodiment.

Process 300 for remote huddle collaboration may be executed, for example, by a huddle collaboration system as shown in FIG. 1, which may include different components that may dynamically interact with each other through network connections.

Process 300 for remote huddle collaboration may start when a user, such as a huddle leader or a huddle participant within a company, may access 302 the website of a huddle collaboration system using a client computing device. This huddle collaboration system may generate a login screen as an initial user interface, through which the user may enter 304 his/her company's credentials, via an input device such as a touch screen, a mouse, a keyboard, a keypad, and others. If the authentication module operating within huddle management system of huddle collaboration system can validate 306 the user's credentials, then, the huddle collaboration system may display 308 the user's huddle boards that may include a list of the huddle boards in which he/she may be participating in and a list of public boards, where these public boards may be viewed by anyone in the company and may be edited by authorized users. Otherwise, the huddle collaboration system may request the user to enter 304 his/her credentials at least one more time.

Users may select 310 from their huddle board list, a huddle board they may wish to participate in via an input device, and then, the huddle collaboration system may display the selected huddle board summary 312 which may show all the sub-applications in the selected huddle board, and each sub-application may display a summary-level view of the data it contains. Sub-applications that may be shown in the user's huddle summary may be text-based, image-based or numeric-based, and may include, but is not limited to, recognition, morale, announcements, key projects, dates/calendar, field metrics, company news (e.g. FYI news feed), leader standard work, employee sentiment, and customer sentiment, among others.

The user's huddle boards may also provide users with a feature which may allow them to search for huddle boards that may not be displayed in the list and for which they may have authorized access, and a feature which may allow authorized users to select from a menu 314 and elect 316 to create a new huddle board via an input device. When users elect 316 to create a new huddle board, the huddle management system may display a huddle board summary 312 of the new huddle.

Figure 4:
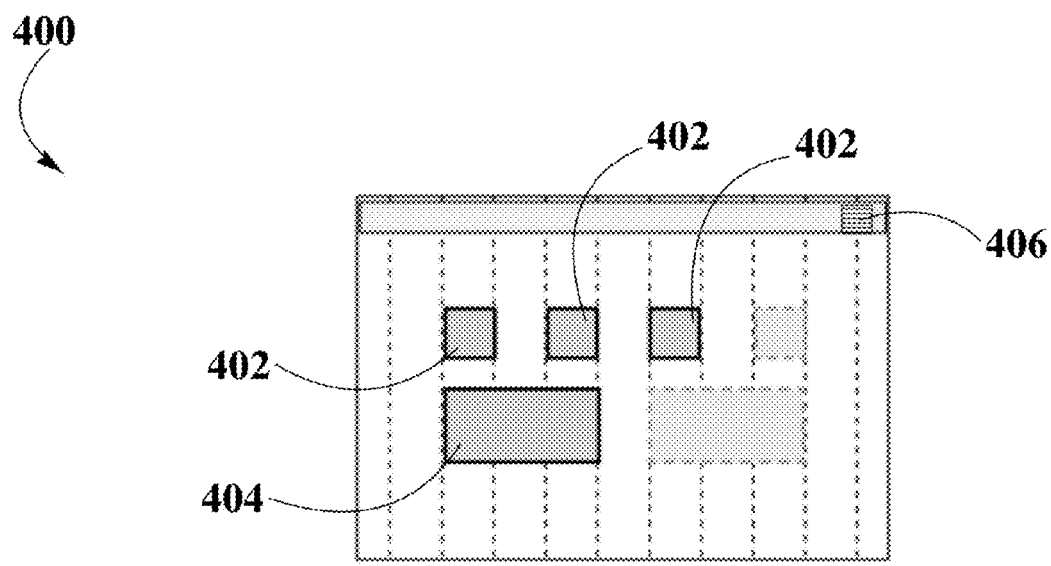
FIG. 4 illustrates the components of a huddle board summary, according to an exemplary embodiment.

FIG. 4 illustrates the components 400 of a huddle board summary, according to an exemplary embodiment. Components 400 of a huddle board summary may include standard sub-applications 402 and custom sub-applications 404.

When a user selects via an input device a huddle board from a huddle board list, the huddle management system may display a huddle board summary.

Huddle board summary user interface may be executed by a huddle collaboration system as shown in FIG. 1, which may include different components that may dynamically interact with each other through network connections.

According to some embodiments of the present disclosure, huddle board summary user interface may enable one or more users, such as a huddle leader and a huddle participant of a company, to preview all the sub-applications in the huddle board, and each sub-application may display a summary-level view of the data it may contain. Huddle board summary may include sub-applications that may be executed by a sub-applications module. Sub-applications may provide meaningful data by surfacing key metrics from a sub-application's detailed view. Huddle board summary may include standard sub-applications 402 and custom sub-applications 404, among others.

Standard sub-applications 402 may contain pre-defined content and have a standard layout and may speed data consumption. Examples of standard sub-applications 402 may include, but not be limited to, morale, recognition, announcements, company news (e.g. FYI news feed), and dates/calendar, among others.

Custom sub-applications 404 may be text-based, image-based, and/or numeric-based, and may include configurable content, title, layout, and may also have configurable metrics that allow for personalization of content. Examples of custom sub-applications 404 may include key projects, dates/calendar, custom data tables, field metrics, leader standard work, customer sentiment, and employee sentiment, among others. Custom sub-applications 404 may be customized by a user, such as a huddle's leader, who may be able to decide which sub-applications may be shown, according to the user's and/or project's requirements. According to other embodiments, a user accredited as administrator may configure the coding of any suitable sub-application within the huddle board according to the project's requirements.

In an active huddle session, the huddle leader may be the only member allowed to customize sub-applications in the huddle board which may be available to the huddle leader according to the huddle requirements during the active huddle session.

Authorized users may access, by means of a computing device, the huddle board summary interface to change a sub-application position within the huddle board summary space to optimize presentation of content to users. Users may specifically position sub-applications within the huddle board summary. For example, a user may employ a computing device to group sub-applications associated with work-related projects in the lower left portion of the huddle board summary while grouping sub-applications associated with a user's personal life in the upper right portion of the huddle board summary. Additionally, custom sub-applications 404 may also be available for an authorized user to add, by means of a computing device, to the huddle board summary choosing from a sub-applications library. A computing device may be used to edit the added sub-application to fit the user requirements. Moreover, if the library of sub-applications does not meet the requirements of a user, the user may access an options menu to create a sub-application (e.g. spreadsheet, images, fill-able calendar), which may be completely customizable; for example, the user may choose the type of sub-application, data included, title, and layout, among others.

In huddle board summary, the team leader may have authorization to edit and/or manage the configuration of the huddle board which provides the team leader with control over the sub-applications that the team participants may use in the huddle board, the name of these sub-applications, and any other suitable configuration of the sub-applications which may satisfy the huddle board requirements. The team participants may use the sub-applications authorized by the team leader for the huddle board, and may have editing and/or viewing rights over one or more sub-applications but may be restricted from editing the configuration of any sub-application. In addition, one or more sub-applications may be controlled by the system and a user, such as a team leader or a team participant, may have viewing rights but may be restricted from editing the configuration of the sub-application.

In addition, huddle board summary user interface may include an options menu 406 which may enable users to access a sub-applications library that may allow them to use and/or add one or more sub-applications to the huddle board. Huddle leaders may be allowed create and/or personalize sub-applications and control to which extent each team participant may have authorization to create and/or personalize one or more sub-applications.

Options menu 406 in huddle board summary may also allow users to join a huddle board, in which one team member may act as a leader of the huddle and the rest of the team members may act as participants. The leader of the huddle may start the session to conduct a huddle and the huddle participants may join the huddle board after the leader has started the huddle.

Figure 5:
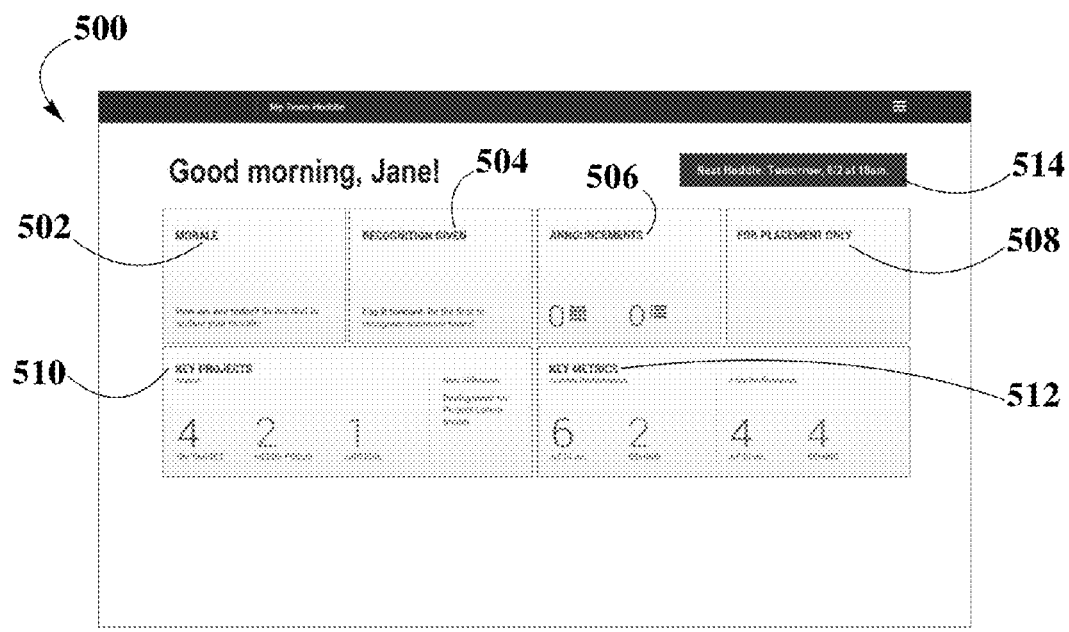
FIG. 5 depicts an example of a user interface displaying a huddle board summary, according to an exemplary embodiment.

FIG. 5 depicts an example of a user interface 500 displaying a huddle board summary, according to an exemplary embodiment.

When a user elects to create a board via an input device a huddle board from a huddle board list, the huddle management system may display a huddle board summary with empty sub-applications. The sub-applications may show prompts designed to encourage users to enter data.

Huddle board summary user interface 500 may be executed by a huddle collaboration system as shown in FIG. 1, which may include different components that may dynamically interact with each other through network connections.

Huddle collaboration system may generate a suitable user interface 500 through which a user, such as a team leader and/or a team participant, may interact with one or more software modules operating within huddle management system by means of a client computing device. The client computing device may be any computer type device such as smartphones, desktop computers, laptop computers, tablets, PDAs, and/or another type of processor-controlled device that may receive, process, and/or transmit digital data. In addition, user interface may be configured to collect information from one or more internal databases, and receive and/or feed information to one or more users interacting with a client computing device.

According to some embodiments of the present disclosure, a huddle board summary may include sub-applications which may be a part of standard or preselected set of sub-applications for every user's huddle such as morale 502, recognition 504, announcements 506, and company news 508 (e.g. FYI news feed), among others.

Morale 502 may be an image and text-based sub-application which may be used by each team member to indicate their feeling before every huddle, by selecting an image from a library and expressing an optional statement of, for example, less than 140 characters. Recognition 504 may be a text-based sub-application which may be used as a place where team members can recognize with a statement of, for example, less than 140 characters, anyone they have worked with for exceptional work. Announcements 506 may be a text-based sub-application which may be used for team members to share important events and/or news with the rest of the team. Company news 508 may be text-based which may provide news and alerts relevant to all the company's employees and may also provide significant news that should be communicated to all the huddle members during an active huddle session. In other embodiments, the sub-applications may also include a dates/calendar sub-application that may be a fillable calendar which may be used as a place for team members to share important dates with one another such as out of office dates, team meeting dates, and others.

In various embodiments, the sub-applications may show prompts surfaced to encourage users to enter data. For example, the prompt included in morale 502 may be "How are you today? Be the first to update your morale!" while the prompt included in recognition 504 may be "Pay it forward. Be the first to recognize someone today!"

Huddle board summary may also include sub-applications which may be customized by the user, who may be able to decide which sub-applications may be shown, according to the user's and/or project's requirements. These sub-applications may include Key projects 510, field metrics 512, and others. Key projects 510 may be a text-based sub-application which may be used as a place to store and track important information about each of the team's key projects. Field metrics 512 may be an image, text, and number-based sub-application which may be used as a place to display figures shared by another business area. In other embodiments, sub-applications may also include, for example, leader standard work and employee sentiment. Leader standard work may be a text-based sub-application which may be used to record the progress on standard work efforts. Employee sentiment may be a text-based sub-application which may be used to view the results of employee surveys.

Custom sub-applications may also be available for an authorized user to add, by means of a computing device, to the huddle board summary choosing from a sub-applications library. A computing device may be used to edit the added sub-application to fit the user requirements. Moreover, if the library of sub-applications does not meet the requirements of a user, the user may access an options menu to create a sub-application (e.g. Spreadsheet, images, fill-able calendar), which may be completely customizable; for example, the user may choose the type of sub-application, data included, title, and layout, among others. Huddle leaders may be allowed to add, create, and/or personalize sub-applications and control to which extent each team participant may have authorization to add, create, and/or personalize one or more sub-applications.

Huddle board summary user interface 500 may show a text legend which may indicate a next huddle 514 scheduled. Additionally, huddle board summary user interface 500 may include an options menu 406 which may enable users to access a sub-applications library that may allow them to use and/or add one or more sub-applications to the huddle board. Options menu 406 may provide huddle members with features that may allow them to add a sub-application to the huddle board, return to home screen, and view changes made to the huddle board as news feed, among others.

Figure 6:
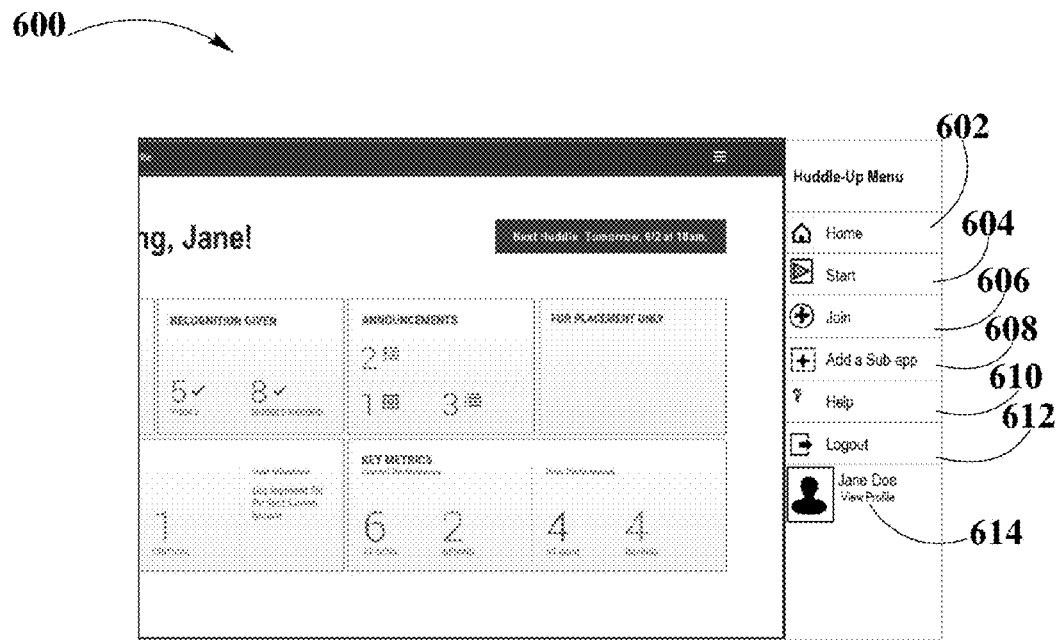
FIG. 6 shows options within a menu of a huddle board summary user interface, according to an exemplary embodiment.

FIG. 6 shows options 600 within a menu of a huddle board summary user interface, according to an exemplary embodiment.

According to an embodiment huddle board summary user interface may include menu options 600. When selected, the menu may "push" the page contents to the left (as shown in FIG. 6) to reveal the available menu options 600. The menu may be manually closed, and may close automatically once a selection has been made.

Options 600 may include home 602, start 604, join 606, add a sub-application 608, help 610, log-out 612, and view profile 614, among others.

Figure 7:
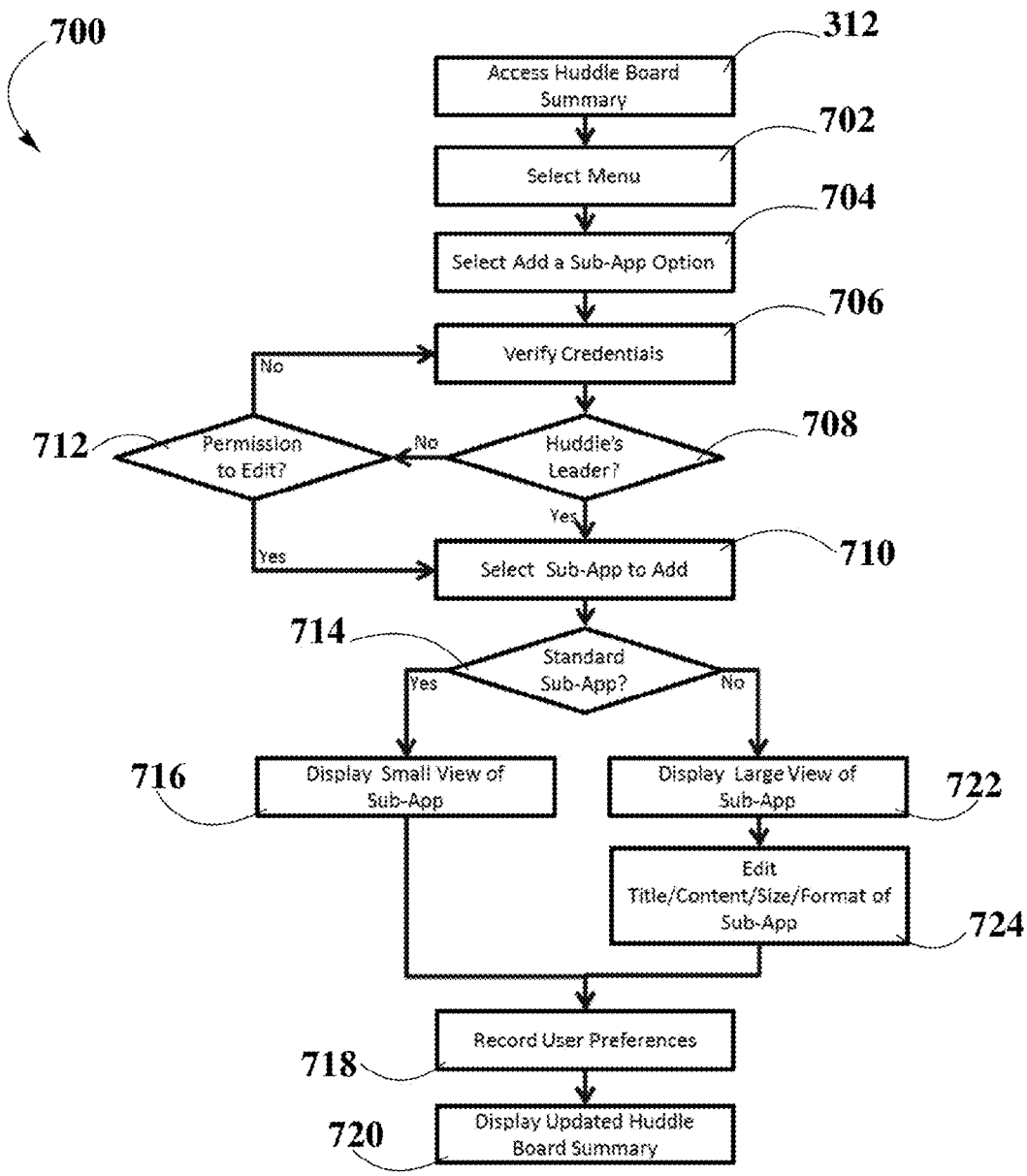
FIG. 7 is a flowchart of a method for customizing sub-application and dashboards in a digital huddle environment, according to an exemplary embodiment where a user is required to add a sub-application to the huddle board.

FIG. 7 is a flowchart of a method 700 for customizing sub-application and dashboards in a digital huddle environment, according to an exemplary embodiment where a user is required to add a sub-application to the huddle board.

After users select a huddle board from their huddle board list, the huddle collaboration system may display the selected huddle board summary 312. Huddle board summary user interface may include an options menu which the user may select 702 by means of a computing device. A computing device may be any computer type device such as smartphones, desktop computers, laptop computers, tablets, PDAs, and/or another type of processor-controlled device that may receive, process, and/or transmit digital data.

The user may use a computing device to select to add 704 a sub-application from the options menu. Add a sub-application option may allow users to personalize current sub-applications and to create sub-applications from generic sub-applications, according to the huddle requirements. Huddle leaders may be allowed to create and/or personalize sub-applications and control to which extent each team participant may have authorization to create and/or personalize one or more sub-applications.

Subsequently, huddle management system may verify 706 the user's credentials to determine if the user may have authorization to access an "add a sub-application" option. First, huddle management system may check 708 if the user is the huddle's leader. If huddle management system identifies the entered credentials as ones belonging to a huddle's leader, huddle management system may allow the huddle's leader to select a sub-application 710 to add. If huddle management system does not identifies the entered credentials as ones belonging to a huddle's leader, huddle management system may check 712 if the leader has granted the user permission to edit the huddle board. If huddle management system does not recognizes that the leader has granted the user permission to edit, huddle management system may allow the user to enter again the credentials to verify 706 the user's credentials again. If huddle management system recognizes that the leader has granted the user permission to edit, huddle management system may allow the user to select a sub-application 710 to add.

If the user employs a computing device to select a standard 714 sub-application, huddle management system may execute a sub-applications module to display a small 716 view of the selected sub-application while a module manager may record 718 the user's preferences in an internal database. Subsequently, huddle management system may display an updated 720 huddle board summary.

If the user does not select a standard 714 sub-application, huddle management system may execute a sub-applications module to display a large 722 view of the selected sub-application. Large 722 view may contain customizable content and may have a configurable layout. Afterwards, the user may edit 724 the title, content, size, format, among others, of the selected sub-application. Subsequently, a module manager may record 718 the user's preferences in an internal database. Then, huddle management system may display an updated 720 huddle board summary. Huddle management system may allow a user to delete a sub-application if necessary.

In other embodiments, huddle management system may also verify if a user has additional permissions, which may allow to configure the coding of any suitable sub-application within the huddle board.

In other embodiments, huddle management system may also verify if a user has additional permissions, which may allow the user to configure the coding of any suitable sub-application within the huddle board.

Figure 8:
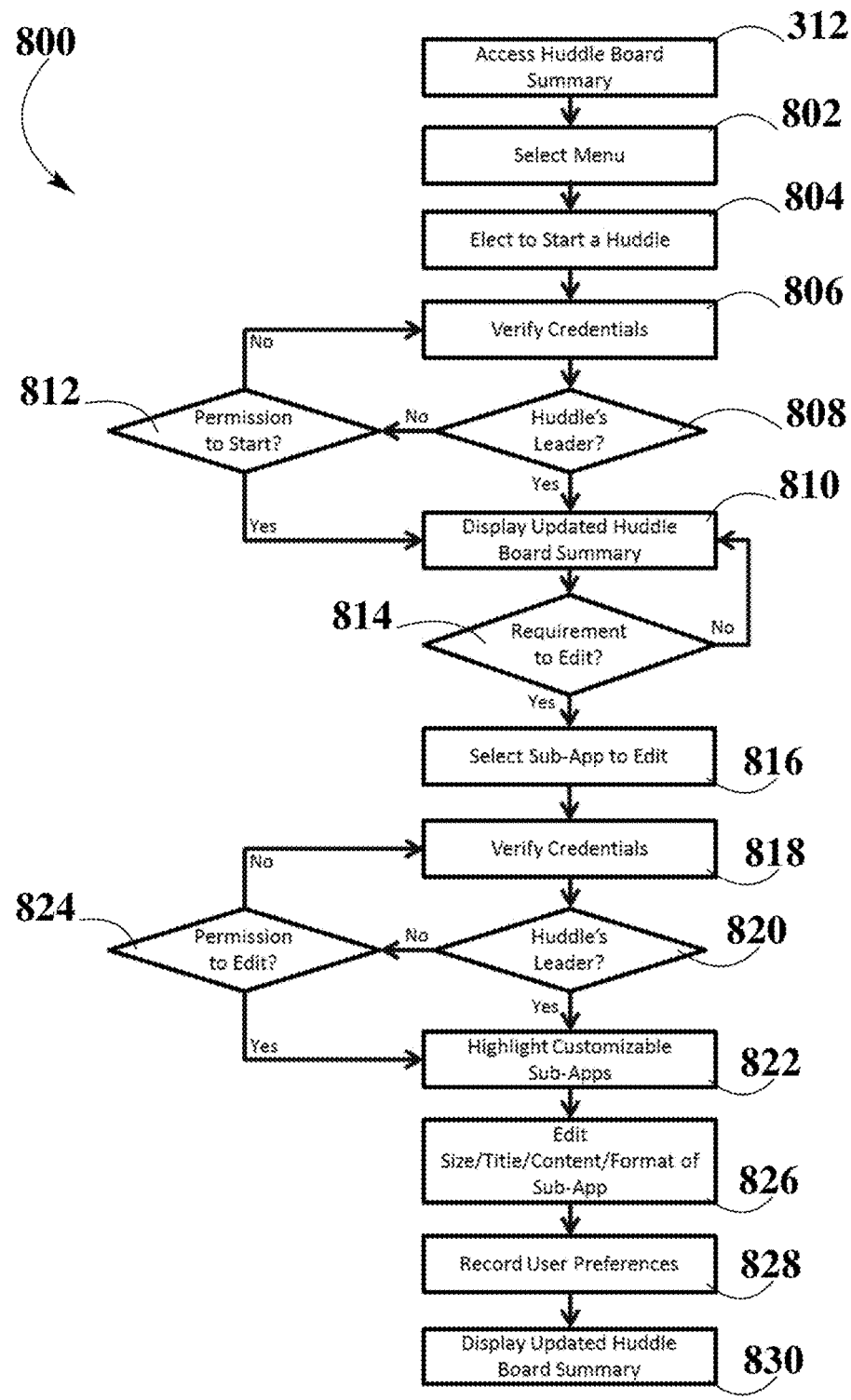
FIG. 8 is a flowchart of a method for customizing sub-applications and dashboards in a digital huddle environment, according to an exemplary embodiment where a user is required to configure sub-applications after starting a huddle.

FIG. 8 is a flowchart of a method for customizing sub-applications and dashboards in a digital huddle environment, according to an exemplary embodiment where a user is required to configure sub-applications 800 after starting a huddle.

After users select a huddle board from their huddle board list, the huddle collaboration system may display the selected huddle board summary 312. Huddle board summary user interface may include an options menu which the user may select 802 by means of a computing device. A computing device may be any computer type device such as smartphones, desktop computers, laptop computers, tablets, PDAs, and/or another type of processor-controlled device that may receive, process, and/or transmit digital data.

The user may use a computing device to elect to start 804 a huddle from the options menu. Start 804 a huddle option may allow to activate a session to conduct a huddle and the huddle participants may join the huddle board after the leader has started the huddle. While in an active session, only a huddle leader may be allowed to create and/or personalize sub-applications and control to which extent each team participant may have authorization to create and/or personalize one or more sub-applications. A huddle leader may start the huddle and may conduct it by viewing and/or editing the content in the huddle, and huddle participants may engage in the huddle by viewing the content which the huddle leader may be showing during the huddle session.

In an active huddle session, the huddle leader may be the only member allowed to customize sub-applications in the huddle board which may be available to the huddle leader according to the huddle requirements during the active huddle session. Sub-applications that may be customizable during the active huddle board session may be one or a combination of text-based, image-based, or numeric-based, and may include, but is not limited to, key projects, dates/calendar, field metrics, company news, leader standard work, employee sentiment, and customer sentiment, among others. In addition, the active huddle board may provide huddle leaders with features that may allow the team leader to record a problem, capture screen shots, return to home screen, view changes made to the huddle board as a news feed, mark up the screen, erase annotations that may have been made using the markup feature, have a video call with huddle members, and chat with other huddle members, among others.

Subsequently, huddle management system may verify 806 the user's credentials to determine if the user may have authorization to activate a huddle session. First, huddle management system may check 808 if the user is the huddle's leader. If huddle management system identifies the entered credentials as ones belonging to a huddle's leader, huddle management system may display 810 an updated huddle board summary. If huddle management system does not identifies the entered credentials as ones belonging to a huddle's leader, huddle management system may check 812 if the leader has granted the user permission to activate a huddle session. If huddle management system does not recognize that the leader has granted the user permission to activate a huddle session, huddle management system may allow the user to enter again the credentials to verify 806 the user's credentials again. If huddle management system recognizes that the leader has granted the user permission to activate a huddle session, huddle management system may display 810 an updated huddle board summary.

After displaying the updated huddle board summary, the user may identify a requirement 814 to edit, and may subsequently use a computing device to select 816 a sub-application to edit from the huddle board summary.

Subsequently, huddle management system may verify 818 the user's credentials to determine if the user may have authorization to edit during an activated huddle session. First, huddle management system may check 820 if the user is the huddle's leader. If huddle management system identifies the entered credentials as ones belonging to a huddle's leader, huddle management system may execute sub-applications module to highlight 822 the customizable sub-applications. If huddle management system does not identify the entered credentials as ones belonging to a huddle's leader, huddle management system may check 824 if the huddle's leader has granted the user permission to edit the huddle board during an activated huddle session. If huddle management system does not recognize that the leader has granted the user permission to edit, huddle management system may allow the user to enter again the credentials to verify 818 the user's credentials again. If huddle management system recognizes that the leader has granted the user permission to edit the huddle board during an activated huddle session, huddle management system may execute sub-applications module to highlight 822 the customizable sub-applications.

Afterwards, the user may employ a computing device to edit 826 the title, content, size, format, among others, of the selected sub-application. Subsequently, a module manager may record 828 the user's preferences in an internal database. Then, huddle management system may display an updated 830 huddle board summary.

In other embodiments, huddle management system may also verify if a user has additional permissions, which may allow to configure the coding of any suitable sub-application within the huddle board.

Figure 9:
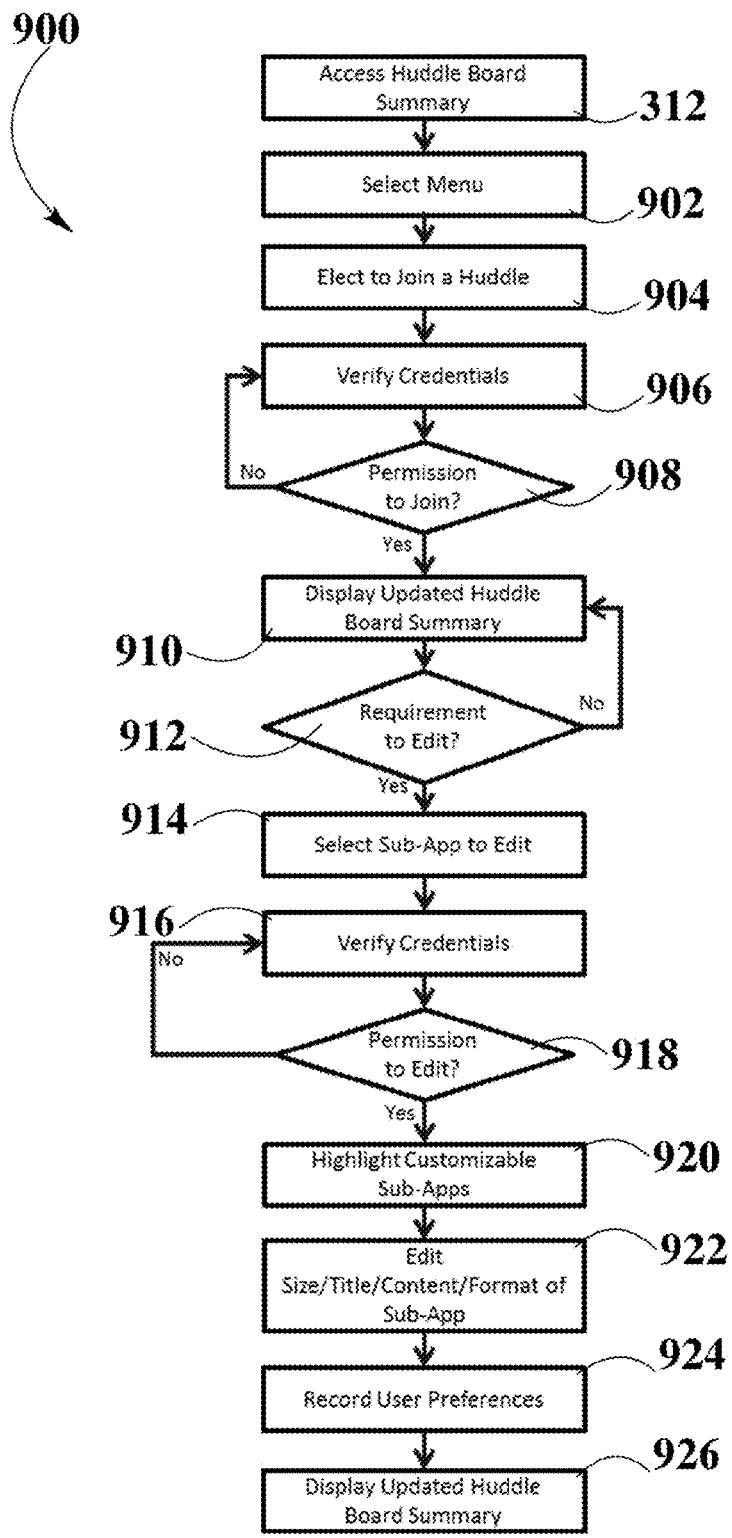
FIG. 9 is a flowchart of a method for customizing sub-applications and dashboards in a digital huddle environment, according to an exemplary embodiment where a user is required to configure sub-applications after joining a huddle.

FIG. 9 is a flowchart of a method for customizing sub-applications and dashboards in a digital huddle environment, according to an exemplary embodiment where a user is required to configure sub-applications 900 after joining a huddle.

Options menu in a huddle board summary may also allow users to join a huddle board, in which one team member may act as a leader of the huddle and the rest of the team members may act as participants. The leader of the huddle may start the session to conduct a huddle and the huddle participants may join the huddle board after the leader has started the huddle. If the huddle participants join the huddle board before the huddle leader starts the huddle, they may access a waiting screen until the huddle leader starts the huddle session.

After users select a huddle board from their huddle board list, the huddle collaboration system may display the selected huddle board summary 312. Huddle board summary user interface may include an options menu. By means of a computing device, the user may select 902 the options menu. A computing device may be any computer type device such as smartphones, desktop computers, laptop computers, tablets, PDAs, and/or another type of processor-controlled device that may receive, process, and/or transmit digital data.

The user may employ a computing device to elect 904 to join a huddle from the options menu. Join a huddle option may allow accessing an active huddle session. Subsequently, huddle management system may verify 906 the user's credentials to determine if the user may have authorization to join the active huddle session. First, huddle management system may check 908 if the user has permission to join the active huddle session. If huddle management system identifies the entered credentials as ones belonging to a user with permission to join the active huddle session, huddle management system may display 910 an updated huddle board summary. If huddle management system does not identify the entered credentials as ones belonging to a user with permission to join the active huddle session, huddle management system may allow the user to enter again the credentials to verify 906 the user's credentials again.

After displaying the updated huddle board summary, the user may identify a requirement 912 to edit and subsequently use a computing device to select 914 a sub-application to edit from the huddle board summary.

Subsequently, huddle management system may verify 916 the user's credentials to determine if the user may have authorization to edit during an activated huddle session. First, huddle management system may check 918 if the huddle's leader has granted the user permission to edit the huddle board during an activated huddle session. If huddle management system does not recognize that the leader has granted the user permission to edit, huddle management system may allow the user to enter again the credentials to verify 916 the user's credentials again. If huddle management system recognizes that the leader has granted the user permission to edit the huddle board during an activated huddle session, huddle management system may execute sub-applications module to highlight 920 the customizable sub-applications.

Afterwards, the user may employ a computing device to edit 922 the title, content, size, format, among others, of the selected sub-application. Subsequently, a module manager may record 924 the user's preferences in an internal database. Then, huddle management system may display an updated 926 huddle board summary.

In other embodiments, huddle management system may also verify if a user has additional permissions, which may allow to configure the coding of any suitable sub-application within the huddle board.

Figure 10:
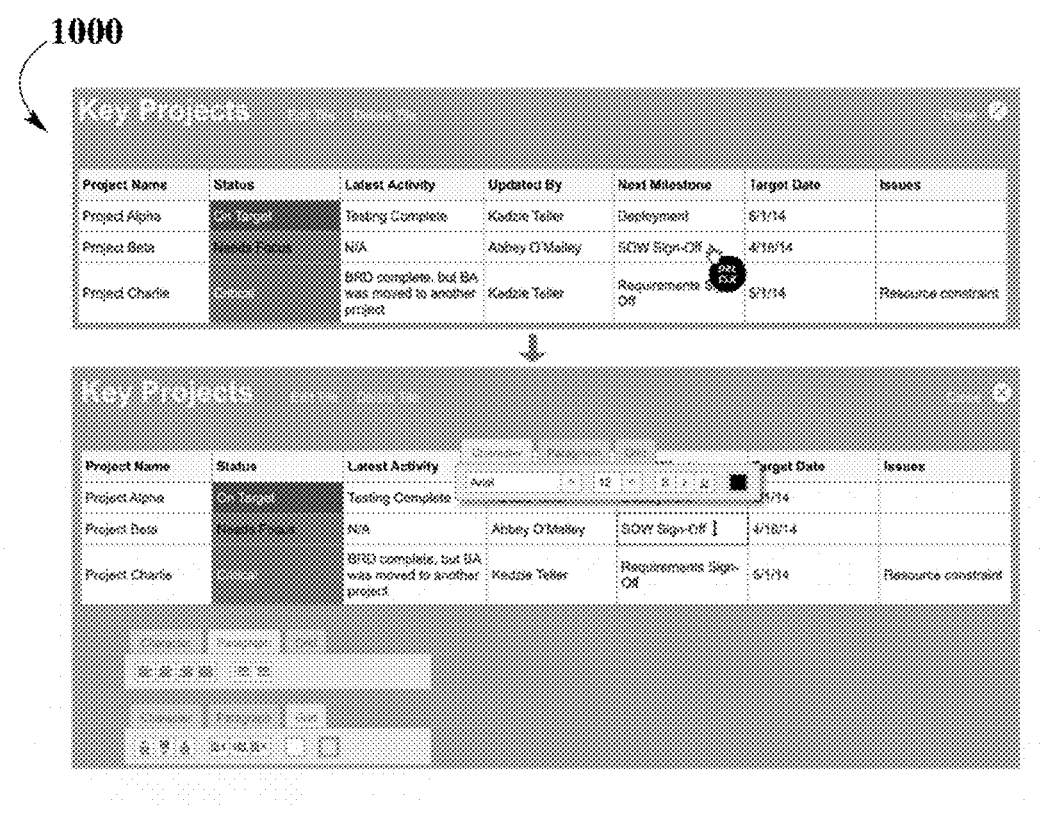

FIG. 10 illustrates an application 1000 of the disclosed method for customizing sub-applications and dashboards in a digital huddle environment, according to an exemplary embodiment.

Example #1 is an application of the disclosed method 700 for customizing sub-applications and dashboards in a digital huddle environment, according to an exemplary embodiment.

In some embodiments, a user may identify the requirement to edit a key projects sub-application and select the key projects sub-application of the huddle board summary. Then, as shown in FIG. 10, huddle management system may display a detailed view of the key projects sub-application. In the detailed view, huddle management system may display a table including projects in which the team is involved. Huddle management system may allow a user to employ a computing device to select a cell. When a cell is selected, huddle management system may execute a sub-applications module to allow a user to edit the content of the cell. Additionally, the sub-applications module may display a menu that may allow a user to edit the character, paragraph, or grid of the cell.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A computer-implemented method comprising:
generating, by a computer, a huddle session for a web-based interaction between a plurality of users on receiving a request from a first user of the plurality of users, wherein the first user is authorized to access a huddle board record associated with the huddle session;
identifying, by the computer, one or more huddle board records associated with each of the plurality of users;
transmitting, by the computer, a graphical user interface webpage displaying at a user device of each of the plurality of users the list of one or more huddle board records associated to each of the plurality of users;
upon receiving from the user device of a user of the plurality of users a selection of a huddle board record through the graphical user interface, providing, by the computer, a huddle board page to the user device, the huddle board page comprising a graphical user interface configured to display one or more sub-applications containing content that is associated with a particular sub-application;
receiving, by the computer, from the user device, a selection of a new sub-application for inclusion to the huddle board page, the new sub-application stored in a sub-application database comprising non-transitory machine-readable storage media configured to store one or more sub-applications;
upon the computer determining the user has access rights to add the new sub-application to the huddle board page, based upon whether the user is the first user who generated the huddle session or if the user is authorized based upon access rights in the huddle board record, and the huddle session is active:
fetching, by the computer, the new sub-application from the sub-application database, wherein the new sub-application contains content configured to be displayed according to a set of content rules associated with the new sub-application;
generating, by the computer, in the huddle board record a set of access rights for one or more new users associated with the new sub-application, based upon one or more rights selections received from the user device;
updating, by the computer, the graphical user interface of the huddle board page based on the new sub-application and the set of content rules associated with the new sub-application;
receiving, by the computer, one or more inputs from a second computing device through the graphical user interface configured to display the huddle board page; and
updating, by the computer, the huddle board page according to the one or more inputs, wherein the graphical user interface is configured to display real-time updates to the one or more sub-applications and the new sub-application, based on inputs received from one or more user computing devices.

2. The computer-implemented method of claim 1, further comprising editing, by the computer, the one or more sub-applications on receiving an editing request from the user device.

3. The computer-implemented method of claim 2, wherein the computer facilitates editing of the one or more sub-applications upon the computer determining that the user has access rights to request the edit of the one or more sub-applications, based upon whether the user is the first user who generated the huddle session or if the user is authorized based upon the access rights in the huddle board record.

4. The computer-implemented method of claim 3, wherein the first user authorizes one or more other users of the plurality of users in the huddle session to generate an editing request for editing the one or more sub-applications in the huddle board page.

5. The computer-implemented method of claim 1, wherein the user of the plurality of users operating the user device edits the one or more sub-applications displayed on the huddle board page.

6. The computer-implemented method of claim 5, wherein the user edits a title, content, size, and a format of the one or more sub-applications displayed on the huddle board page.

7. The computer-implemented method of claim 1, wherein a sub-application of the one or more sub-applications corresponds to a software tool enabling remote collaboration between the plurality of users in a digital huddle environment.

8. The computer-implemented method of claim 1, wherein the user interface of the user device collects data corresponding to the one or more sub-applications from the sub-application database, and transmits the data corresponding to the one or more sub-applications to the plurality of users interacting with the huddle board page.

9. The computer-implemented method of claim 1, wherein the first user authorizes one or more other users of the plurality of users in the huddle session to select the new sub-application for inclusion to the huddle board page.

10. The computer-implemented method of claim 1, wherein a sub-application of the one or more sub-applications is selected from a group consisting of an image-based sub-application, a text-based sub-application, and an numeric-based sub-application.

* * * * *